Oct. 15, 1929.                F. P. McBERTY                1,732,136
                          ELECTRIC WELDING MACHINE
                        Filed Nov. 2, 1927        2 Sheets-Sheet 2

Inventor
F. P. McBerty,
By A. S. Pattison & Son
Attorneys

Patented Oct. 15, 1929

1,732,136

UNITED STATES PATENT OFFICE

FRED P. McBERTY, OF WARREN, OHIO

ELECTRIC WELDING MACHINE

Application filed November 2, 1927. Serial No. 230,625.

This invention relates to improvements in electric welding machines and it pertains particularly to mechanisms adapted for flash and butt welding.

It is well known to those skilled in this art that in electric welding machines of the type referred to, it is necessary that one member of the machine be movable in respect to the other member whereby one part of the rod or other device to be welded is clamped by the movable member and its ends brought together for flash or butt welding.

It has also been well known for a great many years that in machines of this type the bearings have been so constructed and so located that the flash directly strikes them whereby the bearings become pitted and otherwise mutilated, requiring that they be replaced or refitted. It is also known that this condition in machines of the above type occurs in a relatively short time. Although this defect has been well-known to those skilled in this art, so far as I am aware there has been no effort to correct this manifest defect of the machines.

The applicant has been manufacturing machines of the above-discussed type for a good many years, and he has also been aware of the fact that the bearings of the movable parts are subjected to the direct action of the flash. That is to say the flash directly strikes the said bearings whereby they are mutilated in the manner above described.

The applicant has for some time been endeavoring to construct a machine that would not be subjected to the above defects and at the same time a machine which is thoroughly practical in all respects. After several years' experimenting and testing, applicant has at last devised a machine wherein it is so constructed that the bearings are located out of line with the flash so that the flash does not strike the bearings and pit or otherwise mutilate them as above described.

Therefore the principal object of the present invention is the construction of a machine that has its bearings so arranged that the flash does not strike them and the bearings substantially as long-lived as the machine itself.

It is well known to those skilled in the art that in flash and butt welding the flash flies from the weld substantially in a circular line which in machines of the type described, flies in a vertical circle, and that this flash extends in many machines in a vertical circle substantially four, five or more feet according to the character of weld being made.

Another object of the present improvement is in the making of the bearing from a rod to which the movable part of the machine is attached and the said rod made of a length extending beyond the line of flash and the ends of the rod turned down or otherwise provided with a round bearing that is supported in an elongated housing that is supplied with grease, etc., whereby the life of the machine is prolonged in the manner above stated.

In the drawings:

Figure 4 is a detached view of the said improved rod and bearing.

Figure 2:
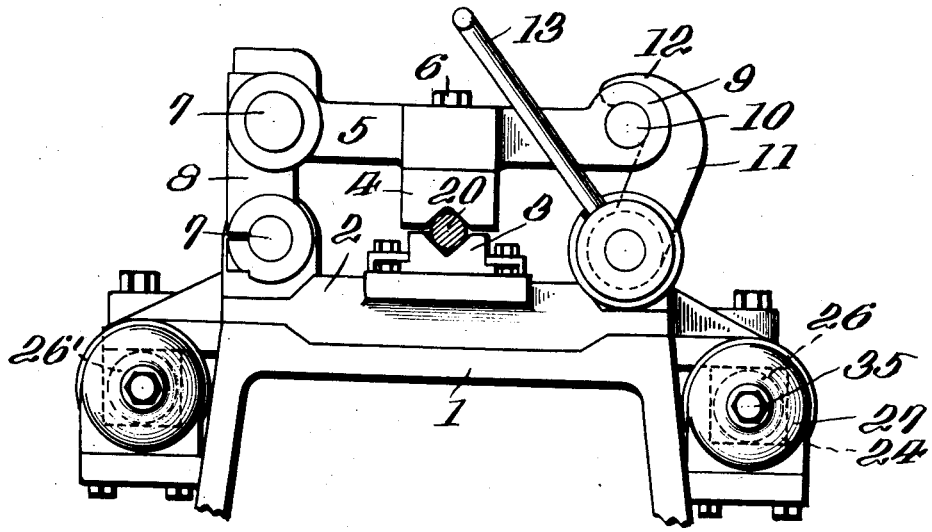
Figure 2 is an end view of Figure 1 looking from the left hand end thereof.

Referring now particularly to Figure 2 of the drawing showing a plan view of the apparatus, there has been no attempt to show the means for moving the movable part thereof and no means for automatic operation whatever, and no means is shown for cooling the clamping electrodes. I therefore wish it to be understood that any desired well constructed means may be provided for the above purposes.

In describing the said machine, I will therefore refer to those parts which are essential for the carrying out of the present invention.

Referring now to the drawings, 1 is part of a base or standard to which a clamping member 2 is suitably connected. This clamping member 2 is preferably not movable save that part of it that carries the clamping electrode 3. Located above this stationary clamping electrode 3 is a vertically movable electrode 4. This electrode is suitably connected to a clamping lever or member 5 either by means of a bolt 6 or otherwise.

Referring to Figure 2, it will be seen that the left hand end of the lever 5 is suitably pivotally connected with the part 2 through the medium of pivots 7 that are connected by an arm 8. The other end of this lever 5 is made bifurcated as at 9 and carries between the bifurcated ends a suitable rod 10. Having its lower end pivoted to the stationary part 2 is a member 11 carrying at its upper end a hook portion 12 that engages the rod 10. Suitably attached to the movable hook 11 is a hand or other operating member 13 by means of which the hook is turned in the position shown in Figure 2 or the hook is detached from the rod 10 by the same lever. This, however, is not essential to the invention but is described for the purpose of enabling the same to be fully understood.

Figure 1:
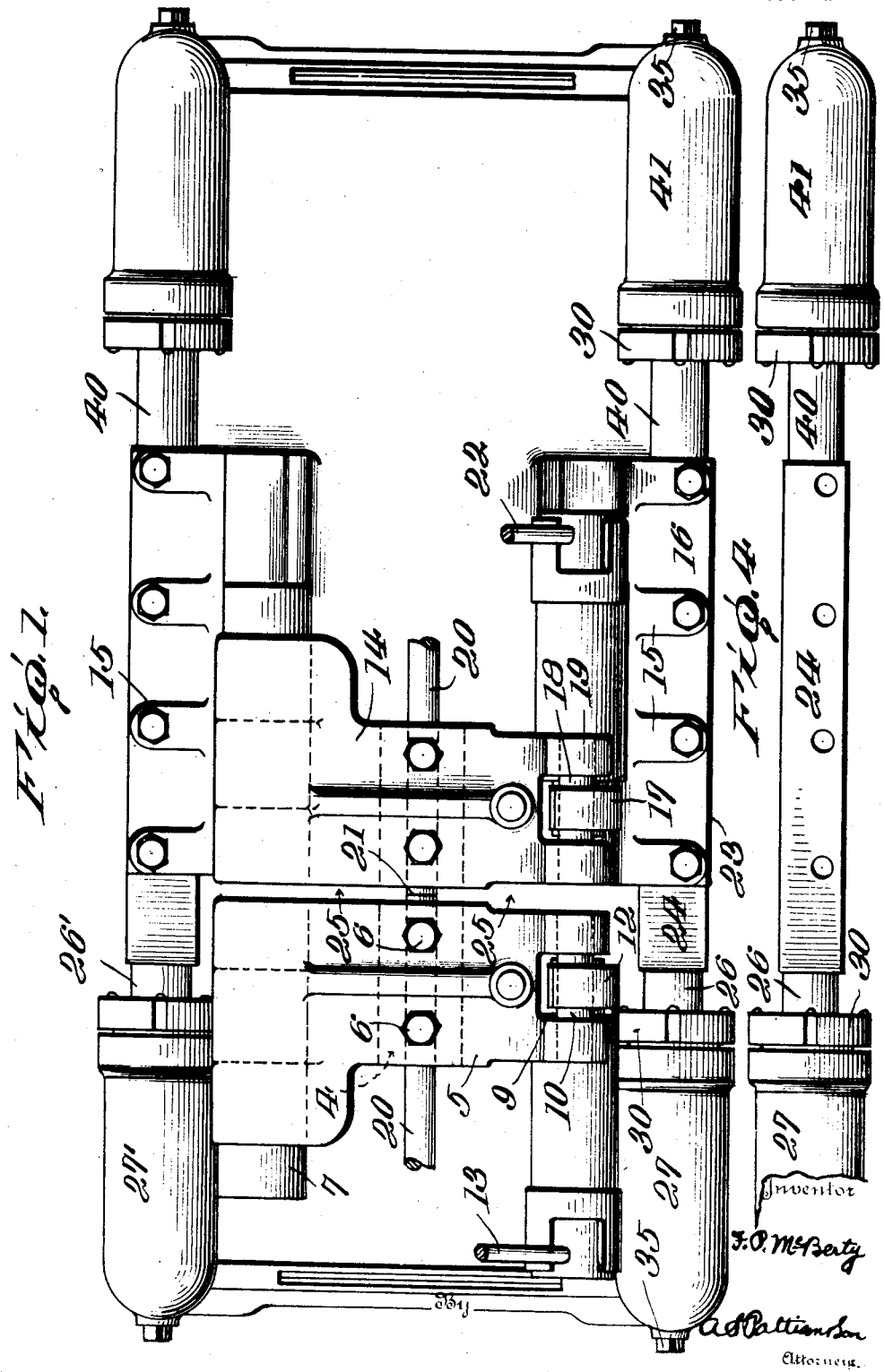
Figure 1 is a top plan view of a machine that embodies the above improvements.

Referring now to Figure 1, the movable member 14 has the opposite sides of its outer portions 15 bolted to the bearing rod 40, and this member carries an electrode similar to the electrode 4, and this electrode is connected in the same manner to a movable lever 5 that is a hook lever provided with a hook 17 that engages a rod 18 secured between the ends of the bifurcated portion 19. It will be understood, of course, that the member 15 with its electrode and the corresponding electrode below the member 14, are all longitudinally movable so that when the part 20 is gripped between the electrodes, its ends 21 can be forced in contact or brought at the proper point for accomplishing flash or butt welding. Attached to the hook member 17 is a suitable lever 22 that operates in the same manner as the lever 13 already described.

The intermediate portion 23 of the bearing rod 40 is here shown as rectangular in shape and the part 15 is bolted to this rectangular shape. Attention is directed to the fact that the angular portion 24 of this rod extends considerably beyond the flash line 25 and beyond this angular portion 24 is a rounded bearing 26. This bearing 26 extends into a suitable housing 27 which is also located at the end of the machine and entirely beyond the said flash line.

This round portion 26 may be made so as to fit directly the said housing 27 though preferably I locate in the housing 27 a bronze bearing 28, the bronze bearing having its outer end abutting against a shoulder 29 in the said housing and the outer end of the housing closed by a member 30 that is provided with an externally screw threaded portion 31 that fits an internally screw threaded portion 32 of the housing 27. The inner end of this screw threaded portion of the member 30 abuts against the outer end of the bronze bearing 28. Also suitably attached to the end of the round bearing portion 26 is a bronze bearing 33, whereby the bronze bearings 28 and 33 take the wearing of the said bearing rod. It will be noted that this construction is furnished with an enlarged portion within the housing for the bearing rod. Attention is also directed to the fact that the housing has a grease compartment 34 located at its outer portion and this grease compartment has an opening 35 that is closed by a movable nut 36 whereby grease may be supplied within the housing for greasing the bearing 28.

It will be observed that the round portion 26 has its bearing wholly within the housing and that the whole bearing portion is located at the end of the machine and entirely out of line with the flash from the weld so that the flash does not strike the bearing 26 and the said bearing is not pitted or mutilated in the manner above described. For the purpose of keeping dust and other dirt from entering the bearing, the outer end of the member 30 is recessed as shown at 37 and a suitable felt or other packing 38 placed therein which is held by a washer 39. This construction keeps dust and accumulated dirt from entering the said housing whereby the bearing is not subjected to the ordinary wear, wholly independent from the flash.

I wish it understood that simply the end 26 may be made to fit within the housing 27 and the bronze bearings be wholly omitted without departing from the main idea of the present invention.

Thus far I have described only one of the bearings. It will, therefore, be understood that the bearing 26' at the other side of the machine is the same construction that has been described, in connection with the other side of the machine. It is therefore deemed unnecessary to repeat the description in respect to the bearing 26' as it will be clearly understood without repetition.

The opposite ends of the bearing rod 16 are provided with the round bearing portions 40 which also move in housings 41 which are constructed the same as the housings 26 for the purpose of reducing the ordinary wear on those parts, and for the purpose of properly balancing the machine and making an operative structure. It will be understood that the parts 40 are not subjected to the direct action of the flash, but are protected merely from the accumulated dust, etc., which occurs around machines of this kind.

From the foregoing description it will be seen that the machine has the bearing rod constructed with the angular or other non-bearing part 24 sufficiently long to span the line of flash whereby the flash directly strikes the non-bearing part 24 and it does not strike the bearing 26 nor does it injure or deteriorate the said bearing that is located beyond this part 24 that extends across the line of the said flash.

In the operation of this machine the part 20 that has to have its ends 21 welded, is clamped between the electrodes 3 and 4 of the non-movable and also movable member whereby the movable member causes the contact between the ends 21 of the rods so that when the electrical current is turned on, the ends are heated up and are pressed together, causing the flash and causing the parts to be electrically welded.

Figure 3:
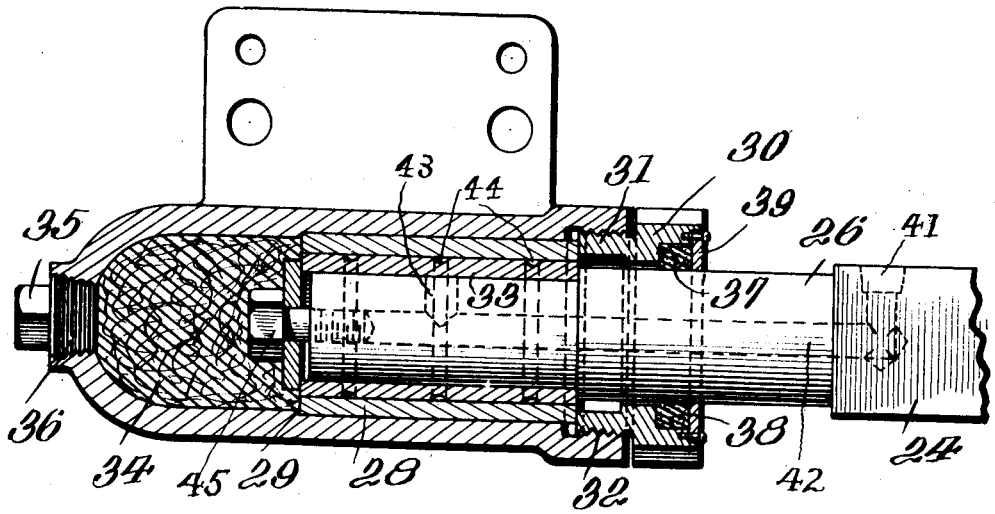
Figure 3 is a relatively enlarged longitudinal sectional view through one of the housings for the said bearing and showing its preferred construction, the said housing being provided with an extension for holding a supply of grease.

Formed in the part 26 is a lateral passageway 43 having its inner end connected with the passageway 42 and its outer end connected with a circumferential groove 44 that communicates with the outer end of the passage 43, the said bronze bushing 33 being of course provided with an opening communicating with the opening 43. The object of this opening is to enable the operator to attach an ordinary grease gun to the opening 41, forcing the grease to the bearing surfaces of the bronze bushing for the purpose of insuring a lubricated bearing between the said bushings 33 and 28. The grooves 44 will be connected by a longitudinal slot (not shown) whereby the said grease is forced by the movement of the parts into the several grooves. The purpose of this lubrication of the parts is that in the working of the machine continuously with comparatively short strokes, then the running parts might not get lubrication. With this initial lubrication and the lubrication of the grease 34, then lubrication of the parts is insured, irrespective of the amount of movement thereof. By reference to Figure 1 it will be noted that the welding points 21 are in engagement and therefore the longitudinally movable portion 26 carrying the bronze bearing 33 (Fig. 3) is substantially at its innermost position within the casing 27. Hence the grease compartment 34 is only partially filled whereby the parts are allowed the necessary free movement within the housing 27 in order to accomplish the welding of the points 21.

While I have here described in detail the several parts of the machine, I wish it understood that variations may be made in it without departing from the spirit or scope of the said invention so long as the changes come within a fair interpretation of the claims.

Having thus described my invention, what I desire to claim and secure by Letters Patent is:

1. An electric welding apparatus comprising stationary and movable electrodes for clamping the parts to be welded, the movable electrodes being provided with laterally extended parts, journal rods to which the movable part is connected, the journal rod extending beyond the line of flash and a journal projecting from the end of the said rod, and a housing located at the end of the machine forming a bearing for the movable journal of the said rod.

2. An electric welding apparatus comprising movable and immovable members adapted to clamp the parts to be welded, a frame for the said parts, the movable member having laterally projecting portions, the flash line being between the movable and immovable members, journal rods extending beyond the said flash line, housings located at the ends of the machine and beyond the said end of the rod, and journal projecting longitudinally from the said journal rod and into the said housings, whereby the journal rod crosses the line of flash and the journal is located beyond the line of flash whereby the flash does not strike it and deteriorate the same.

3. An electric welding machine comprising a suitable supporting frame, clamping members extending transverse the said frame, said members adapted to clamp the parts to be welded, thereby forming a flash line between the adjacent portions of the clamping members, one of said members being movable in respect to the other clamping member, journal rods to which the said movable member is attached, the journal rod extending across and beyond the line of flash, housings secured to opposite sides of the frame and into which the journal ends of the rod pass, whereby the said journal is not in line with the flash and is not deteriorated by the flash striking the same, for the purpose specified.

4. An electric welding apparatus comprising clamping members for clamping the parts to be welded, one of said members movable in respect to the other member whereby the welding flash line is located between the adjacent sides of the said clamping members and a journal rod for the movable member and to which it is attached, the rod made sufficiently long to project beyond the said flash, the end of the journal rod having a journal attached thereto, and a housing located at the end of the machine into which the said journal projects, said housing having a grease compartment for the purpose described.

5. An electric welding machine comprising a suitable frame having at two of its corners longitudinally extending housings, a clamping member located substantially in a line with the inner ends of the said housings, and a movable clamping member located inside of the first-mentioned clamping member, the clamping members adapted to clamp the parts to be welded whereby the flash lines between their adjacent sides, a journal rod sufficiently long to cross the said flash line and to which journal rod the movable clamping member is attached, and journals projecting from the ends of the journal rod and entering the said housings for the purpose specified.

6. An electric welding apparatus comprising a suitable supporting frame having located at one side of its corners suitable housings, a clamping member located substantially in a line with the inner ends of one portion of the housings, a movable clamping member located between the housings at the other end and the first said clamping member, the clamping members adapted to clamp the parts to be welded whereby the flash line is located between the adjacent sides of the clamping members, and a journal rod to which the movable member is attached and which extends beyond the said flash line, the opposite ends of the journal rod provided with journals which enter the said housings whereby the flash does not strike the bearings and deteriorate them.

7. An electric welding apparatus comprising a supporting frame, electrodes adapted to clamp the parts to be welded, one of said electrodes being movable longitudinally to bring the parts to be welded together, a journal rod connected with the movable electrode having a journal, and a housing, both said journal and the housing located out of lateral alignment with the ends of the parts to be welded whereby the journal rod is protected from the direct impact of the flash caused during welding.

In testimony whereof I hereunto affix my signature.

FRED P. McBERTY.